US012741739B2

(12) United States Patent
Dufay

(10) Patent No.: US 12,741,739 B2
(45) Date of Patent: Sep. 22, 2026

(54) CAPTURE PIN FOR A LOCKING HOOK

(71) Applicant: SAFRAN LANDING SYSTEMS, Velizy-Villacoublay (FR)

(72) Inventor: Ludovic Dufay, Moissy-Cramayel (FR)

(73) Assignee: SAFRAN LANDING SYSTEMS, Velizy Villacoublay (FR)

(*) Notice: Subject to any disclaimer, the term of this patent is extended or adjusted under 35 U.S.C. 154(b) by 1111 days.

(21) Appl. No.: 17/791,590

(22) PCT Filed: Jan. 8, 2021

(86) PCT No.: PCT/EP2021/050290

§ 371 (c)(1),
(2) Date: Jul. 8, 2022

(87) PCT Pub. No.: WO2021/140210

PCT Pub. Date: Jul. 15, 2021

(65) Prior Publication Data

US 2023/0031765 A1 Feb. 2, 2023

(30) Foreign Application Priority Data

Jan. 10, 2020 (FR) ...................................... 2000217

(51) Int. Cl.
*B64C 25/26* (2006.01)
*E05B 85/04* (2014.01)
(Continued)

(52) U.S. Cl.
CPC ............ *B64C 25/26* (2013.01); *E05B 85/045* (2013.01); *F16C 11/045* (2013.01);
(Continued)

(58) Field of Classification Search
CPC ......... B64C 25/26; B64C 25/28; B64C 25/14; B64C 25/34; F16F 1/025; E05B 85/045;
(Continued)

(56) References Cited

U.S. PATENT DOCUMENTS 2,562,778 A * 7/1951 Egly ....................... B64C 25/12 267/173
2,596,202 A 5/1952 Bolte
(Continued)

FOREIGN PATENT DOCUMENTS

EP 3 517 430 A1 7/2019
GB 626280 A 7/1949
KR 10-1872908 B1 8/2018

OTHER PUBLICATIONS

International Search Report for PCT/EP2021/050290 dated Mar. 30, 2021 [PCT/ISA/210].

*Primary Examiner* — Daniel J Wiley
(74) *Attorney, Agent, or Firm* — Sughrue Mion, PLLC

(57) ABSTRACT

An aircraft landing gear includes a landing gear provided with a yoke supporting a spindle on which is mounted a capture pin to be hooked by a hook of a locking box to be mounted on a structure of an aircraft to immobilize the landing gear in a given position with respect to the structure. The capture pin includes a body provided with a longitudinal opening enabling the capture pin to be mounted on the spindle, and an outer surface of revolution having a central portion having a convex profile to cooperate with the hook. A central portion of the outer surface is formed on a central ring which is mounted so as to rotate freely on a central portion of the body.

12 Claims, 2 Drawing Sheets

(51) Int. Cl.
*F16C 11/04* (2006.01)
*F16C 11/06* (2006.01)
*F16C 23/04* (2006.01)
*F16C 33/10* (2006.01)

(52) U.S. Cl.
CPC ........ *F16C 11/0614* (2013.01); *F16C 23/045* (2013.01); *F16C 33/10* (2013.01); *F16C 2326/43* (2013.01); *F16C 2350/52* (2013.01)

(58) Field of Classification Search
CPC .. F16C 11/045; F16C 11/0614; F16C 23/045; F16C 33/10; F16C 2326/43; F16C 2350/52
See application file for complete search history.

(56) References Cited

U.S. PATENT DOCUMENTS 4,065,077 A * 12/1977 Brooks ................ B64D 27/404 60/797
4,392,622 A * 7/1983 McClaflin ............... B64C 25/10 244/102 A
4,392,623 A * 7/1983 Munsen .................. B64C 25/10 244/102 R
4,493,680 A * 1/1985 Hoffmann ............... F16G 13/06 403/151
6,273,613 B1 * 8/2001 O'Brien ................ F16C 11/045 384/624
7,775,093 B2 * 8/2010 Cooper ............... G01M 5/0041 403/2
9,623,961 B2 * 4/2017 Williams ................ E05B 85/04
11,440,635 B1 * 9/2022 Kandavalli .......... B64D 27/404
2013/0020436 A1 * 1/2013 Ducos ..................... B64C 25/12 244/102 A
2013/0104375 A1 * 5/2013 Blades .................... F16C 11/02 403/156
2015/0354614 A1 * 12/2015 Green ..................... F16C 25/04 24/711.5
2017/0291695 A1 * 10/2017 Foster ..................... B64C 25/10
2020/0354085 A1 * 11/2020 Baird ......................... F16N 7/00
2021/0261241 A1 * 8/2021 Holt ................... B64D 45/0005
2025/0282475 A1 * 9/2025 Nascimento ............ B64C 25/26

* cited by examiner

CAPTURE PIN FOR A LOCKING HOOK

CROSS REFERENCE TO RELATED APPLICATIONS

This application is a National Stage of International Application No. PCT/EP2021/050290 filed in the European Patent Office on Jan. 8, 2021, claiming priority based on French Patent Application No. 2000217 filed in the French Patent Office on Jan. 10, 2020, the contents of each of which being incorporated by reference herein in their entireties.

The invention relates to a capture pin for a locking hook.

BACKGROUND OF THE INVENTION

Aircraft comprise a certain number of movable elements between a deployed position and a retracted position, such as landing gears, doors, wing tips. These movable elements are provided with a capture pin adapted for at least one of the abovementioned positions to be hooked by a locking hook supported by the structure of the aircraft to immobilise the movable elements in position.

The capture pin is generally presented in the form of a body of revolution having an axial opening to be able to be received rotating freely on a spindle supported by the movable element, such that it can roll on the hook during berth or during release. However, cases of the capture pin being seized on the spindle have been observed, generating a friction between the capture pin and the hook during the moving of the latter, sometimes making it difficult to release the capture pin.

To avoid this situation, it is known to mount the spindle rotating freely in the yokes receiving its ends, so as to enable a rotation of the capture pin and spindle assembly in case of the capture pin being seized on the spindle. However, such a solution is not satisfactory in operation. In particular, it is difficult for an operator to verify if the spindle is blocked or rotating freely during an inspection operation. Moreover, the free rotation of the spindle makes its use as a lubrication channel for the capture pin difficult in practice.

[1] Translation of the title as established ex officio.

OBJECT OF THE INVENTION

The invention aims to propose a capture pin enabling to decrease the abovementioned disadvantages.

SUMMARY OF THE INVENTION

With a view to achieving this aim, a capture pin is proposed, intended to be mounted on a movable element to be hooked by a locking hook with a view to immobilise the movable element in a given position, the capture pin comprising a body provided with a longitudinal opening for it to be mounted on a spindle, and an outer surface of revolution having a central portion having a convex profile with which the hook cooperates, characterised in that the central portion of the outer surface is formed on a central ring which is mounted so as to rotate freely on a central bearing surface of the body.

Thus, even if the body of the capture pin seizes on the spindle on which it is threaded, the central ring can always rotate freely on the body, so as to roll on the hook. The invention therefore enables a double rotation, without the spindle rotating freely.

What is more, the inspection of free rotation of the body and the central ring is very simple and is adapted to regular inspections of pre-flight visits.

According to particular aspect of the invention, the outer surface of the capture pin comprise a first side portion formed on one side of the central ring on a portion integrally with the body, and a second side portion formed on another side of the central ring on an auxiliary ring which is mounted so as to rotate freely on an auxiliary bearing surface of the body.

If necessary, the central bearing surface and the auxiliary bearing surface are formed on one same cylindrical surface.

According to a first embodiment variant, the first side portion, the central portion and the second side portion of the outer surface give this a fracture-free convex profile without breaking.

By "fracture-free" convex profile, this means a substantially smooth convex profile, i.e. varying continuously and relatively progressively, without any step of other breakage of the profile.

According to a second embodiment variant, the first and second side surfaces of the outer surface extending along cylindrical surfaces.

According to a particular embodiment of the invention, the body is made of steel, while the central ring is made of a material adapted to friction and resistant to seizing.

The invention also relates to an aeronautical device comprising a fixed element on which is mounted a movable element provided with such a capture pin, a locking hook being connected to the fixed element to hook the capture pin and to retain the movable element in a given position with respect to the fixed element.

The invention further relates to a landing gear comprising a movable element provided with such a capture pin.

The invention also relates to a method for mounting a capture pin according to the invention, comprising the free rotational mounting of the capture pin on the spindle of the movable element, the spindle being immobilised in rotation on the movable element.

DESCRIPTION OF THE FIGURES

The invention will be better understood in the light of the following description of a particular embodiment of the invention, given with reference to the figures of the accompanying drawings, in which.

DETAILED DESCRIPTION OF THE INVENTION

Figures 1, 2:
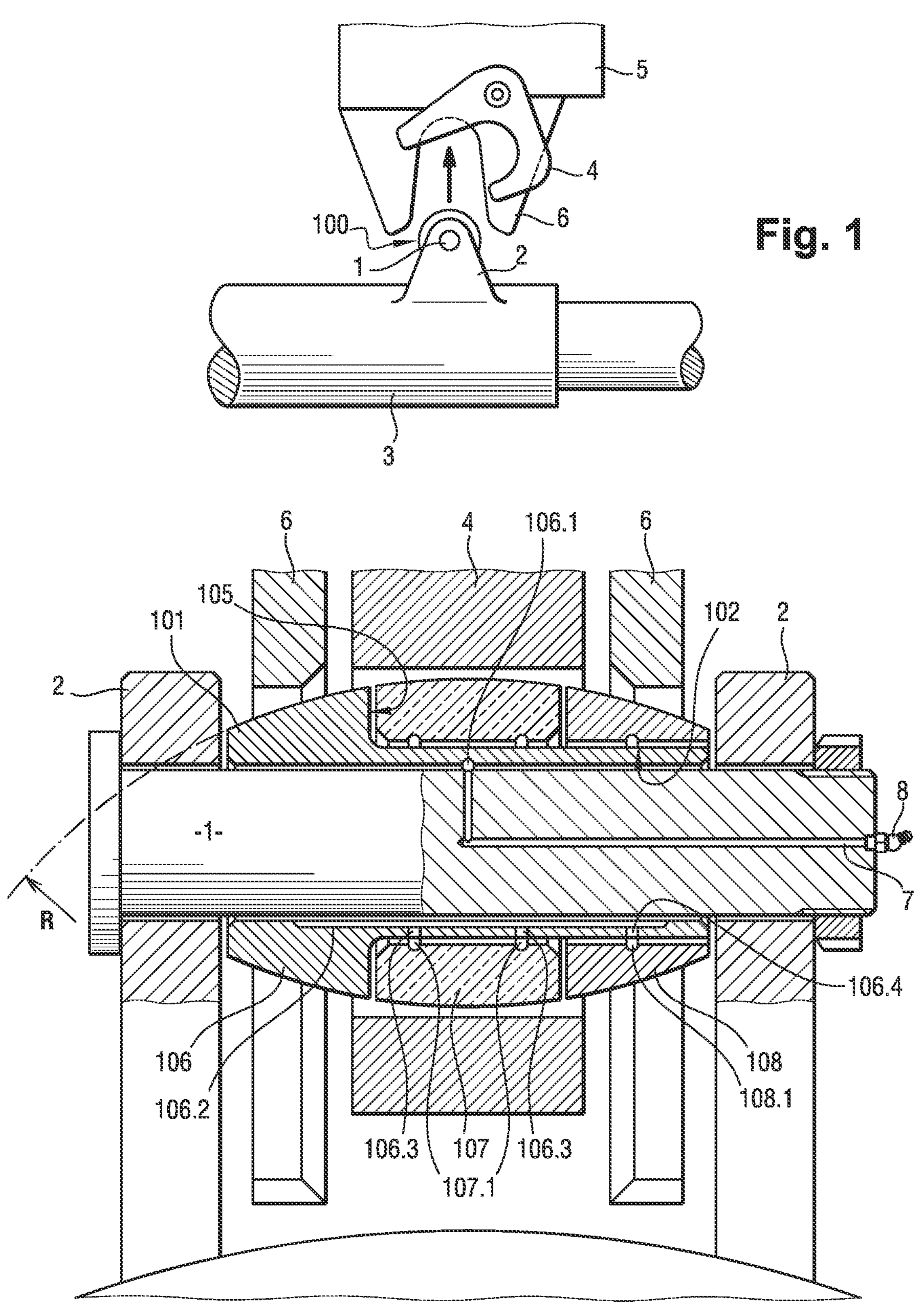
FIG. 1 is a front view of a movable element of a capture pin according to a first particular embodiment of the invention, during the approach of the hook of a locking box, one of the guides of the locking box having been removed for more clarity.
FIG. 2 is a longitudinal cross-sectional view of the capture pin of FIG. 1 received in the locking box hook, the clearances having been exaggerated for more clarity.
Figure 3:
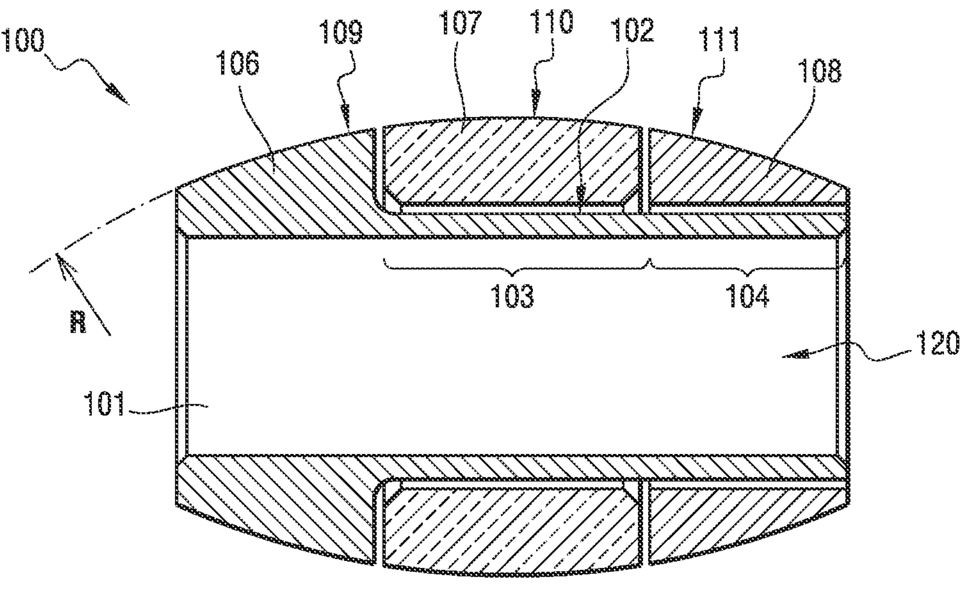
FIG. 3 is a view similar to that of FIG. 1, only illustrating the capture pin per se.

In reference to FIGS. 1, 2 and 3, the capture pin 100 of the invention is of revolution and comprises a body 101 comprising a cylindrical longitudinal opening 120 to be threaded on a spindle 1 mounted on two yokes 2 of a movable element 3, for example, in this case, an aircraft landing gear. The capture pin 100 is intended to be hooked by a hook 4 of a locking box 5 when the movable element 3 arrives in a position in which it must be immobilised and locked. To this end, the locking box 5 comprises, in this case, guides 6 on either side of the hook 4 to guide the capture pin 100 during the berth of the hook 4.

According to the invention, the body 101 comprises a cylindrical outer surface 102 successively defining a central bearing surface 103 and an auxiliary bearing surface 104. The central bearing surface 103 is axially limited by a shoulder 105 formed by a face of a side protrusion 106 of the body 101. On the central bearing surface 103 and the auxiliary bearing surface 104, a central ring 107 and an auxiliary ring 108 are threaded, received in free rotation about one same axis of rotation.

The central ring 107 is intended to come into contact with the hook 4, while the protrusion 106 and the auxiliary ring 108 are intended to come into contact with the guides 6. The central ring 107 is free to rotate on the body 101, such that if this seizes on the spindle 1, the central ring 107 can always rotate during its contact with the hook 4. A rotation redundancy is thus achieved, which does not require that the spindle 1 is mounted rotating in the yokes 2 of the movable element 3, such that the spindle 1 can be mounted immobilised in rotation in the yokes 2. Likewise, the rotational mounting of the auxiliary ring 108 on the body 101 enables a relative rotation of the outer surfaces of the protrusion 106 and of the auxiliary ring 108, which facilitates the rolling of the capture pin 100 along the guides 6.

What is more, it is easy for operators to verify the free rotation of the body on the spindle, as well as the free rotation of the rings on the body. The verification procedure consists of blocking the rotation of the central ring 107 with one hand and to make the protrusion 106 and the side ring 108 rotate with the other hand. This procedure enables to verify all the glide tracks. The detection of blockages is therefore considerably facilitated.

In this case, and according to a first embodiment variant which can particularly seen in FIG. 3, the side protrusion 106, the central ring 107 and the auxiliary ring 108 have respective outer surfaces 109, 110, 111 which each define portions (respectively, two side portions framing a central portion) of an outer surface of the capture pin having a fracture-free convex profile. In the embodiment illustrated, the profile is circular arch-shaped, therefore with a constant bend radius R, but any other fracture-free convex profile suits in the scope of the invention.

Figure 4:
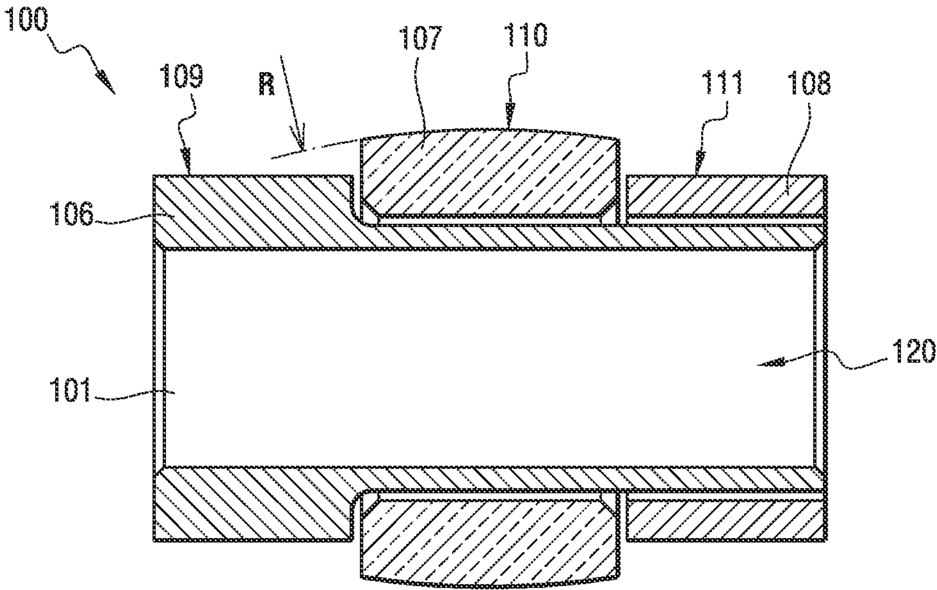
FIG. 4 is a view similar to that of FIG. 3 of an embodiment variant of the capture pin of the invention.

According to an embodiment variant illustrated in FIG. 4, the protrusion 106 and the auxiliary ring 108 have a cylindrical outer surface, such that only the outer surface of the central ring 107 is curved. This arrangement decreases the risk of deterioration of the outer surfaces of the protrusion 106 and of the auxiliary ring 108 by excessive contact pressure against the guides 6.

The embodiment of the capture pin 100 in several parts enables to choose separate materials for the body and the rings. In particular, it can be chosen to make the body from steel and the central ring from material adapted to friction and resistant to seizing, for example, bronze or iron alloy. Alternatively, self-lubricated bushes can be interposed between the body and the rings. The friction surfaces of the spindle 1, of the body 101 and of the rings 107 and 108, of coatings can also directly be provided, facilitating their sliding.

This embodiment of several parts enables, if necessary, only replaces the most used part(s), while leaving the others in operation.

The double rotation initiated according to the invention between the spindle 1 and the body 101 of the capture pin, and between the body 101 of the capture pin and the central ring 107 enables the use of a spindle 1 stopped in rotation on the yokes 2. The immobilisation of the spindle 1 enables to avoid large movements between the spindle 1 and the inner diameter of the the yokes 2 which can cause degradations of surfaces in contact. It is subsequently possible to drill a lubrication channel 7 into the spindle 1, opening, on the one hand, substantially to the middle of the body 1 and on the other hand, to one of the ends of the spindle 1 provided with a lubricator 8. The immobilisation of the spindle 1 enables to orient the lubrication hole perpendicularly to the load, in the neutral plane, and thus to increase the resistance of the part. It will thus be noted that, although the radial section of the lubrication channel 7 had been represented in the cut plane of FIG. 2, this radial section is positioned in practice to extend perpendicularly to the cut plane of FIG. 2. The protrusion 106 is internally provided with an annular groove 106.1, in which the radial section of the lubrication channel 7 opens, and an axial slot 106.2, at the closed ends, in which radial conduits 106.3, 106.4 open, which pass through the thickness of the protrusion 106 to open up opposite on the outer surface of the protrusion 106. The two channels 106.3 open up facing an annular groove 107.1 arranged inside the ring 107 and the conduit 106.4 opens up facing an annular gorge 108.1 arranged inside the ring 108. It can be understood that:

- the radial section of the lubrication channel 7, the annular groove 106.1 and the axial slot 106.2 form means for lubricating the interface between the spindle 1 and the body 101;
- the radial section of the lubrication channel 7, the annular groove 106.1, the axial slot 106.2, the radial conduits 106.3 and the annular grooves 107.1 form means for lubricating the interface between the protrusion 106 and the ring 107;
- the radial section of the lubrication channel 7, the annular groove 106.1, the axial slot 106.2, the radial conduit 106.4 and the annular groove 108.1 form means for lubricating the interface between the protrusion 106 and the ring 108.

The invention is not limited to the above description, but on the contrary covers any variant coming within the scope defined by the claims.

In particular, although the capture pins illustrated in this case comprise an auxiliary bearing surface extending into the extension of the central bearing surface to receive an auxiliary ring, the auxiliary bearing surface can extend along another cylindrical surface than that of the central bearing surface. The auxiliary bearing surface and the auxiliary ring can even be removed, by making the latter integral with the body or by shrinking, so as to form a second protrusion. The central ring will thus be advantageously provided in two parts to be able to be mounted on the central bearing surface between the two protrusions. Of course, there is subsequently no longer the option of relative rotation between the two protrusions.

Alternatively, the protrusion can be removed to replace it on the body by a second auxiliary bearing surface adapted to receive a second auxiliary ring which is mounted so as to rotate freely.

Although the outer surface of the two side portions 109, 111 on either side of the central portion 110 has been described as extending with the central portion according to a fracture-free convex profile, it is possible to provide another profile, progressively varying or not (thus presence of a fracture, like a step).

The guides 6 are optional.

The invention relates to any aeronautical device comprising a fixed element on which is mounted a movable element provided with a capture pin according to the invention, a locking hook being connected to the fixed element to hook the capture pin and to retain the movable element in a given position with respect to the fixed element.

The invention is, for example, applicable to an aircraft landing gear, comprising a movable element provided with such a capture pin. The movable element is, for example, the landing gear box, the box being hinged to a structure of the aircraft to be movable in a manner known per se, between an output position of the wheel well, the capture pin being hooked by the locking hook when the box is in the retracted position to hold the box in this position.

The movable element can also be an wheel well door or any other movable element of an aircraft. The invention also applies to fields other than that of vehicles.

The invention claimed is:

1. An aircraft landing gear, comprising a landing gear provided with a yoke supporting a spindle on which is mounted a capture pin to be hooked by a hook of a locking box to be mounted on a structure of an aircraft to immobilize the landing gear in a given position with respect to said structure; the capture pin comprising a body provided with a longitudinal opening enabling the capture pin to be mounted on the spindle, and an outer surface of revolution having a central portion having a convex profile to cooperate with the hook, wherein the central portion of the outer surface is formed on a central ring which is mounted so as to rotate freely on a central portion of the body.

2. The aircraft landing gear according to claim 1, wherein the body is made of steel, and the central ring is made of a material adapted to friction and resistant to seizing.

3. The aircraft landing gear according to claim 1, wherein the spindle is immobilized in rotation on the aircraft landing gear.

4. The aircraft landing gear according to claim 3, wherein the spindle is provided with a lubrication channel opening onto an end of the spindle.

5. A method for controlling a capture pin in the aircraft landing gear according to claim 1, the method comprising verifying free rotation of parts of the capture pin.

6. The method according to claim 5, further comprising verifying the free rotation of the body on the spindle, and the free rotation of the central ring on the body.

7. An aircraft landing gear, comprising a landing gear provided with a yoke supporting a spindle on which is mounted a capture pin to be hooked by a hook of a locking box to be mounted on a structure of an aircraft to immobilize the landing gear in a given position with respect to said structure; the capture pin comprising a body provided with a longitudinal opening enabling the capture pin to be mounted on the spindle, and an outer surface of revolution having a central portion having a convex profile to cooperate with the hook, wherein the central portion of the outer surface is formed on a central ring which is mounted so as to rotate freely on a central portion of the body, and wherein the outer surface of revolution of the capture pin comprises two side portions, one on either side of the central portion of the outer surface of revolution, the two side portions extending with the central portion of the outer surface of revolution according to a fracture-free convex profile.

8. The aircraft landing gear according to claim 7, wherein the fracture-free convex profile has a constant curvature.

9. An aircraft landing gear, comprising a landing gear provided with a yoke supporting a spindle on which is mounted a capture pin to be hooked by a hook of a locking box to be mounted on a structure of an aircraft to immobilize the landing gear in a given position with respect to said structure; the capture pin comprising a body provided with a longitudinal opening enabling the capture pin to be mounted on the spindle, and an outer surface of revolution having a central portion having a convex profile to cooperate with the hook, wherein the central portion of the outer surface is formed on a central ring which is mounted so as to rotate freely on a central portion of the body, and wherein the outer surface of revolution of the capture pin comprises two side portions, one on either side of the central portion of the outer surface of revolution, the two side portions extending along cylindrical surfaces.

10. An aircraft landing gear, comprising a landing gear provided with a yoke supporting a spindle on which is mounted a capture pin to be hooked by a hook of a locking box to be mounted on a structure of an aircraft to immobilize the landing gear in a given position with respect to said structure; the capture pin comprising a body provided with a longitudinal opening enabling the capture pin to be mounted on the spindle, and an outer surface of revolution having a central portion having a convex profile to cooperate with the hook, wherein the central portion of the outer surface is formed on a central ring which is mounted so as to rotate freely on a central portion of the body, and wherein the body supports an auxiliary bearing surface on which an auxiliary ring is received rotating freely, coaxially to the central ring.

11. The aircraft landing gear according to claim 10, wherein the central portion of the body is a central bearing surface, and the central bearing surface and the auxiliary bearing surface are formed on one same cylindrical outer surface of the body.

12. A method for controlling a capture pin in the aircraft landing gear according to claim 10, the method comprising verifying free rotation of the body on the spindle, and verifying the free rotation of each of the central ring and the auxiliary ring on the body.

* * * * *